United States Patent [19]
Takahashi

[11] Patent Number: 6,031,902
[45] Date of Patent: Feb. 29, 2000

[54] DEALING COMMUNICATION SYSTEM

[75] Inventor: Toshiei Takahashi, Fukushima, Japan

[73] Assignee: Hitachi Telecom Technologies, Ltd., Koriyama, Japan

[21] Appl. No.: 09/032,917

[22] Filed: Mar. 2, 1998

[51] Int. Cl.[7] .................................................. H04M 1/00
[52] U.S. Cl. ........................................... 379/165; 379/165
[58] Field of Search ...................................... 379/156, 157, 379/158, 159, 160, 161, 162, 163, 164, 165, 166

[56] References Cited

U.S. PATENT DOCUMENTS

| | | | |
|---|---|---|---|
| 4,536,621 | 8/1985 | Bergen et al. | 179/99 R |
| 5,309,509 | 5/1994 | Cocklin et al. | 379/165 |
| 5,465,292 | 11/1995 | Takahashi et al. | 379/164 |

*Primary Examiner*—Curtis A. Kuntz
*Assistant Examiner*—Quoc Tran

*Attorney, Agent, or Firm*—Foley & Lardner

[57] ABSTRACT

The invention has a purpose of making the operability and functionality of a simultaneous all together communication (a broadcasting communication) good. A dealing communication system of the embodiment provides with COT 1-2 to be called with a public line, DBDLIN 1-7 connected to BD 1—1 and CLU 1-6 accommodating and being connected to COT 1-12 and DBDLIN 1-7. DB 1—1 has a structure comprising a display 2—2 for displaying the broadcasting transmission key 3-5 instructing the broadcasting transmission operation to all lines of line group previously stored and displaying the line key 2-3 instructing a transmission /reception operation on said line corresponding to DB 1—1, a hands-set 2-14 for carrying out a communication, and CPU (not shown) for executing the broadcasting transmission operation on all lines of line group in response to a one-touch operation of the broadcasting transmission key 3-5 displayed on the display 2—2, resulting in a possibility of the broadcasting communication to all lines of the line group through the hands-set.

10 Claims, 8 Drawing Sheets

DEALING COMMUNICATION SYSTEM

BACKGROUND OF THE INVENTION

This invention relates to a communication board of a dealing communication system used to carry out a financial transaction in the financial offices, such as banks and security companies and the like, a communication board for carrying out a transaction of precious metals, a reception desk of taxi companies and transportation companies and the like, a communication board for simultaneously informing the emergency information of a holiday banking system, and general office telephones.

Conventionally, such dealing communication system necessitates an exclusive-use open voice microphone in order to realize a simultaneous all together communication function, so called a broadcasting function for carrying out simultaneously the outgoing call to a plurality of predetermined lines from the communication board and simultaneous all together communicating with these all lines. As a result, it is necessary to install the open voice device for the open voice microphones on the communication board.

That is, according to the conventional dealing communication system, such simultaneous all together communication function has been realized by providing the open voice microphones of the open voice device on the communication board.

The dealing communication system provided with such open voice installation, has a freely set function for setting at will an open voice opposite party or office in cooperation with speaker setting.

Therefore, the communication board necessitating the broadcasting function (the simultaneous all together communication function) must be provided with an open voice device, resulting in very much rise of the cost of the system.

According to the conventional dealing communication system, an information terminal other than the communication board must be installed on the dealing desk, and further a spare space of the dealing desk is necessary to the open voice microphone to be placed therein.

According to the conventional dealing communication system, a simultaneous all together transmission through the open voice microphone is able to set on only one group having a plurality of predetermined lines. Therefore, it has been necessary to change successively a setting of the opposite party of the speaker when the simultaneous all together transmission to other opposite party group is carried out. It is a troublesome point consuming hand works very much.

This invention is invented in order to solve such problems of the prior art mentioned above, and a purpose of this invention resides in a provision for a dealing communication system having a simultaneous all together communication function of excellent cost-performance ratio and high operability and functionality.

SUMMARY OF THE INVENTION

In order to attain this purpose above, the dealing communication system described in claim 1 of the invention has a public line trunk connected to a public line, a communication board line circuit connected to a communication board, and a line control unit for accommodating and connecting the public line trunk and the communication board line circuit. The communication board has a key display means for displaying a line key and a simultaneous all together transmission key, a hands-set for carrying out a communication, a control means for executing the simultaneous all together transmission operation. The line key instructs with a one-touch manual operation a transmission operation for executing an outgoing call to the particular line or a reception operation for receiving an incoming call. The simultaneous all together transmission key instructs the simultaneous all together transmission operation to all lines of the line group previously stored by a one-touch operation. The control means executes the simultaneous all together transmission operation to all lines of the line group in response to the one-touch operation of the simultaneous all together transmission key displayed on the key display means. The control means can execute the simultaneous all together communication to all lines of the line group through the hands-set.

The dealing communication system is constructed with a communication board and a line control unit. The line control unit accommodates various circuits and terminals, for example, a digital monitor line circuit connected to the open voice microphone/speaker, a multifunction telephone line circuit connected to the multifunction telephones, and a line circuit connected to the general telephones.

The public line trunk corresponds to a trunk connected to an analog public line and a digital public line.

The communication board corresponds to a dealing board provided with a communication function used in, for example, financial transaction.

The communication board line circuit connected to the communication board corresponds to, for example, a digital communication board line circuit.

The key display means is structured by combining a display and a touch panel, or a display or a hard key. The key display means can execute a call transmission reception operation of the line corresponding to the line key by means of touching the line key displayed on the display, or pressing the line key (hard key) corresponding to a line name displayed on the display.

The hands-set corresponds to two hands-sets placed at the left and the right sides of, for example, the communication board. As a result, two simultaneous communications are possible and a hands-free communication is possible using a hands-free function without using hands.

Consequently, according to the dealing communication system described in claim 1 of the invention, using the hands-set (or the hands-free microphone) of the communication board and not-installing the open voice device, this dealing communication system can carry out the simultaneous all together communication function. As a result, because such open voice device is not necessary, it is possible to make a cost-performance ratio of the system good and to guarantee a wide working space on the dealing desk.

The dealing communication system described in claim 2 of the invention, in addition of the structure of claim 1, is characterized in that the key position of the simultaneous all together key displayed on the key display means is able to be flexibly stored by a predetermined operation.

Consequently, the dealing communication system described in claim 2 of the invention is characterized in that the storing content of key position of the simultaneous all together key displayed on the key display means is changeable. As a result, because the storing content of the key position of the simultaneous all together key displayed on the key display means is changeable by user's predetermined operation, it is possible for the user to set the position of the simultaneous all together key at any position.

The dealing communication system described in claim 3 of the invention, in addition to the structure of claim 1 or 2, is characterized in that the line of the line group to be called up by the simultaneous all together transmission can be flexibly stored according to a predetermined operation.

The dealing communication system described in claim 4 of the invention, in addition of the structure in claim 3, is characterized in that the 16 lines of one line group to be called up by the simultaneous all together transmission can be stored at the maximum.

The lines of the line group to be called up by the simultaneous all together communication in the conventional system can be stored only with setting the speaker in the open voice device. However, in the dealing communication system described in claim 3 or 4 of the invention, the lines of the line group to be called up can be stored without using the open voice device. Therefore, it is possible to remarkably improve the operability and the functionality with reference to the simultaneous all together communication.

The dealing communication system described in claim 5 of the invention, in addition to the structure of claim 1,2,3 or 4, is characterized in that a plurality of simultaneous all together transmission keys displayed on the key display means of the communication board can be stored.

As a result, according to the dealing communication system described in claim 5 of the invention, a plurality of the simultaneous all together transmission keys displayed on the key display means can to be stored. So it becomes possible for the broadcasting opposite party to set a plurality of patterns, resulting in a high efficiency of business.

Furthermore, in the dealing communication system described in claim 6 of the invention, in addition to the structure of claim 1,2,3,4 or 5, the lines of the line group to be called up by the simultaneous all together communication can be used in an ordinal call transmission and an ordinal call reception, and the line can be used in an individual communication, when the line corresponding to the line key.

As a result, according to the dealing communication system described in claim 6 of the invention, it is possible to attain an ordinal individual communication to the line corresponding to the simultaneous all together communication.

Also, according to the dealing communication system described in claim 7 of the invention, in addition to the structure of claim 5 or 6, the line of each line group stored in the simultaneous all together transmission key can be stored in an overlap manner on other simultaneous all together transmission key. When a simultaneous all together transmission operation from the other communication board is applied to the corresponding line under such simultaneous all together communication with the one communication board, the communication between the one communication board under the present simultaneous all together communication and the corresponding line has a priority.

It is possible to add a simultaneous all together transmission message (a broadcasting outgoing call information) to the transmission message between the communication board and the line control unit, so that the communication board can inform to the line control unit the line corresponding to the outgoing call.

Consequently, according to the dealing communication system described in claim 7 of the invention, the line control unit recognizes the corresponding line under the simultaneous all together communication with the one communication board. Therefore, even though the other communication board executes the simultaneous all together communication to the corresponding line, the communication between the one communication board and the corresponding line has a priority. Therefore, the present simultaneous all together communication is not hindered. Further the communication board under the present simultaneous all together transmission operation can execute the simultaneous all together communication with the other line except for the corresponding line under the simultaneous all together communication.

The principle above-mentioned is able to apply to a situation of individual communication, not simultaneous all together communication.

According to the dealing communication system described in claim 8 of the invention, in addition to the structure of claim 1,2,3,4,5,6 or 7, when the outgoing call operation is carried out by the simultaneous all together transmission key, the line key corresponding to the line corresponding to the outgoing call is changed to its own communication indication.

When the outgoing call operation is carried out by the simultaneous all together transmission, the outgoing call condition of the corresponding line to be called up contained in line keys of the communication board is displayed on the basis of a line lamp information of the standard interface between the communication board and the line control unit.

As a result, according to the dealing communication system described in claim 8 of the invention, the indication of the line key under the simultaneous all together transmission is displayed with its own communication indication. Therefore, the user can see and recognize the lines under the present simultaneous all together transmission.

According to the dealing communication system described in claim 9 of the invention, in addition to the structure of claim 1,2,3,4,5,6,7 or 8, a spontaneous disconnection of the communication path at the reception side and a cut-off of the speaker prevent a howling from generating, when an outgoing call operation is carried out by the simultaneous all together transmission key.

The line control unit has a control function of catching and calling-up the trunk accommodating the line corresponding to the simultaneous all together communication when receiving the line information corresponding to the simultaneous all together communication. Further, the line control unit has a control function of connecting in a multiple manner the communication path at the transmission of the corresponding communication board to the trunk corresponding to the outgoing call.

When the line corresponding to the simultaneous all together communication is monitor-set in the open voice speaker, the dealing communication system cuts off spontaneously the path at the speaker side during the simultaneous all together communication and restores again the path at the monitor side in ending the broadcasting, so that it can certainly prevent a howling from generating during the simultaneous all together communication.

According to the dealing communication system described in claim 10 of the invention, in addition to the structure described in claim 5,6,7,8 or 9, the key display means of the communication board has a pagination function, thus an overlap-storing of the simultaneous all together transmission key is made possible on a plurality of pages of the key display means.

Accordingly, according to the dealing communication system described in claim 10 of the invention, a pagination function of the key display means makes an overlap-storing of the simultaneous all together transmission key on a plurality of pages possible, so that a plurality of patterns can be set by the broadcasting opposite party, resulting in improving the effectiveness of the business.

DETAILED EXPLANATION

Figure 1:
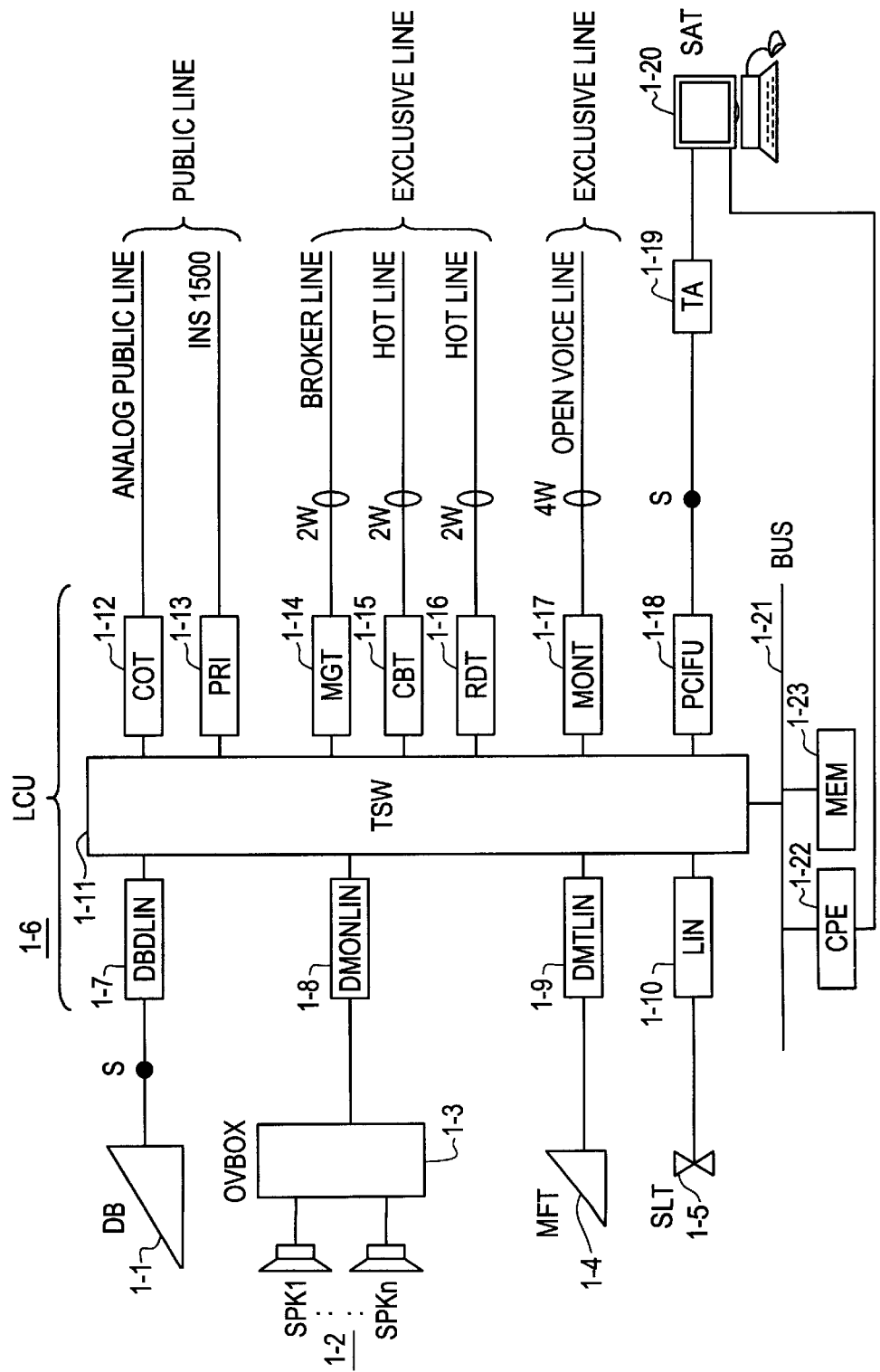
FIG. 1 is a block diagram of an embodiment of the dealing communication system according to the invention, showing an outline inner structure of the dealing communication system employing a broadcasting system.

The dealing communication system according to the embodiment of the invention will be explained with reference to the drawings. FIG. 1 is a block diagram of an embodiment of the dealing communication system according to the invention, showing an outline inner structure of the dealing communication system employing a broadcasting system.

This dealing communication system employs a broadcasting system having a simultaneous all together communication function.

As shown in FIG. 1, a line transmission/reception communication board (hereinafter, it is called simply a communication board; DB) 1—1 is connected to a digital communication line circuit (DBDLIN) of a line control unit (LCU) 1-6 through S point of I interface of a digital line interface and to a communication path switch (TSW) 1-11 through B channel.

An open voice box (OVBOX) 1-3 to which a plurality of monitor speakers (SPK1–SPKm) of open voice devices is installed on the communication board 1—1 necessitates the open voice line to be accommodated therein according to the business.

Also, the open voice box (OVBOX) 1-3 corresponding to the plurality of monitor speakers (SPK1–SPKn) is connected to a digital monitor line circuit (DMONLIN) 1-8 of an open voice exclusive line circuit and to the communication path switch 1-11 through the digital monitor line circuit 1-8.

The communication path switch (TSW) 1-11 is connected to a public line through a public line trunk (COT) 1-12 or a primary group interface (PRI) 1-13. Further, the communication path switch (TSW) 1-11 is connected to the exclusive line through a magnetic trunk (MGT) 1-14, a common battery trunk (CBT) 1-15, a ring down trunk (RDT) 1-16 or a four-line type monitor trunk (MONT) 1-17.

The public line is an analog public line and INS 1500 line. The analog public line is connected to the public line trunk (COT) 1-12 and INS 1500 line is connected to the primary group interface (PRI) 1-13.

Further, the exclusive line means a broker line and two hot lines. The broker line is connected to the magnetic trunk (MGT) 1-14 and these hot lines respectively are connected to the common battery trunk (CBT) 1-15 and the ring down trunk (RDT) 1-16.

The exclusive line connected to the four-line type monitor trunk (MONT) 1-17 is connected to a four-line type (4W) open voice line.

The communication path switch (TSW) 1-11 is connected to a terminal adapter (TA) 1-19 at S point interface through a PC interface trunk (1-18) and to an integrated administration terminal (SAT) 1-20 through the terminal adapter (TA) 1-19.

The integrated administration terminal (SAT) 1-20 is connected to a central processing equipment (CPE) 1-22 of the line control unit (LCU) 1-6. The integrated administration terminal (SAT) 1-20 executes a management of a public data of the communication board (DB) 1—1 and a public data of the line control unit (LCU) 1-6. The public data of the line control unit (LCU) 1-6 is stored in a memory (MEM) 1-23.

A general telephone (SLT) 1-5 is connected to the communication path switch (TSW) 1-11, other than the communication board (DB) 1—1 of a communication terminal, through the line circuit (LIN) 1-10.

The central processing equipment (CPE) 1-22 and the memory (MEM) 1-23 are connected to the communication path switch (TSW) 1-11 through the line bus 1-21.

A multifunction telephone (MFT) 1-4 is connected with the communication path switch (TSW) 1-11 through a digital multifunction telephone line circuit (DMTLIN) 1-19.

Figure 2A:
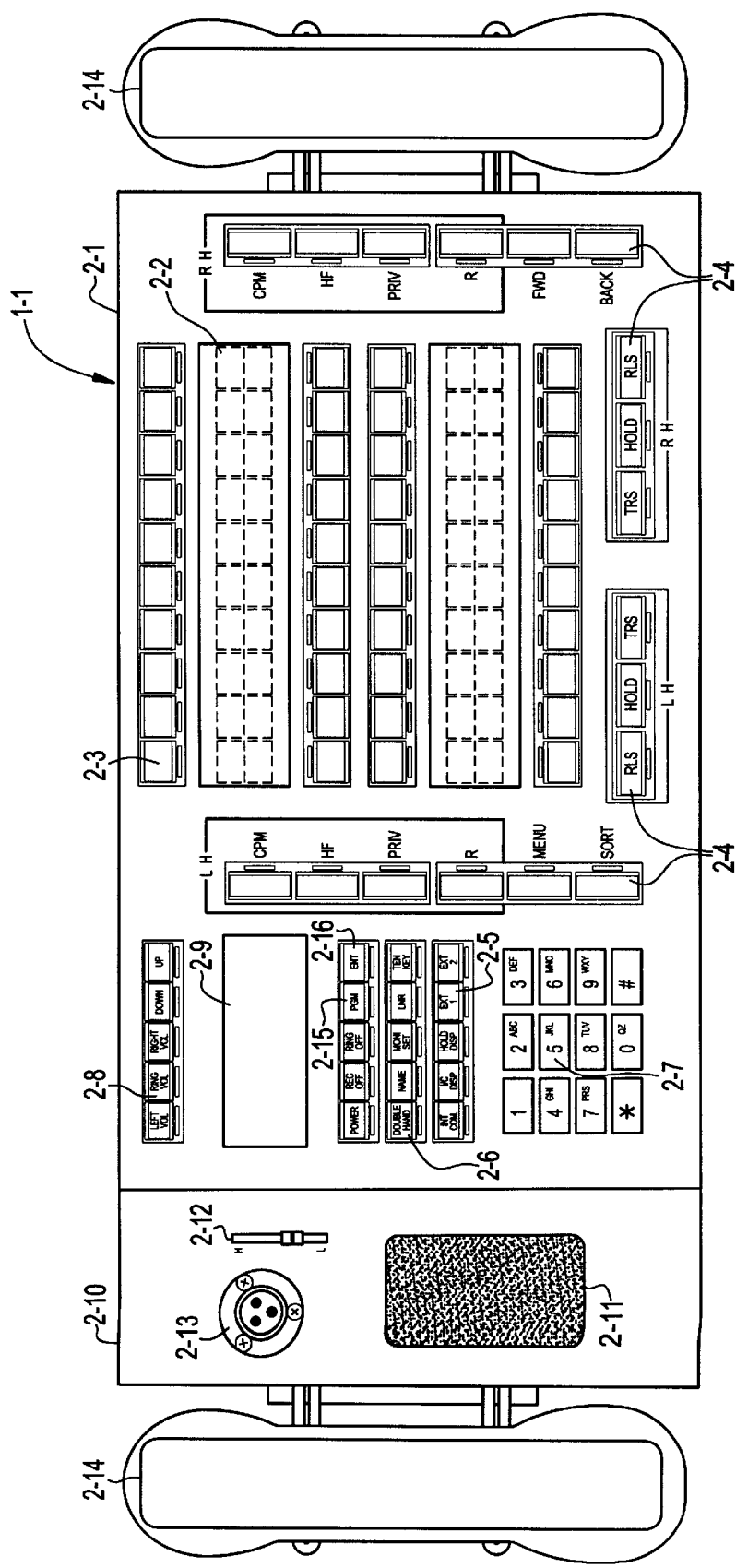
FIG. 2 is an appearance view of the communication board employing the broadcasting system according to the embodiment of the invention, wherein (a) is its plane view, (b) is its back view, and (c) is a right side view.
Figure 2B:
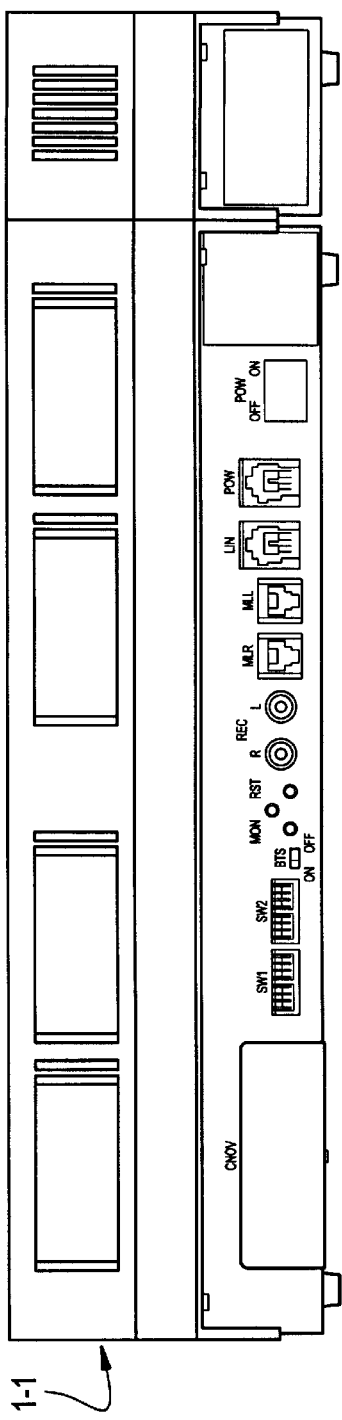
Figure 2C:
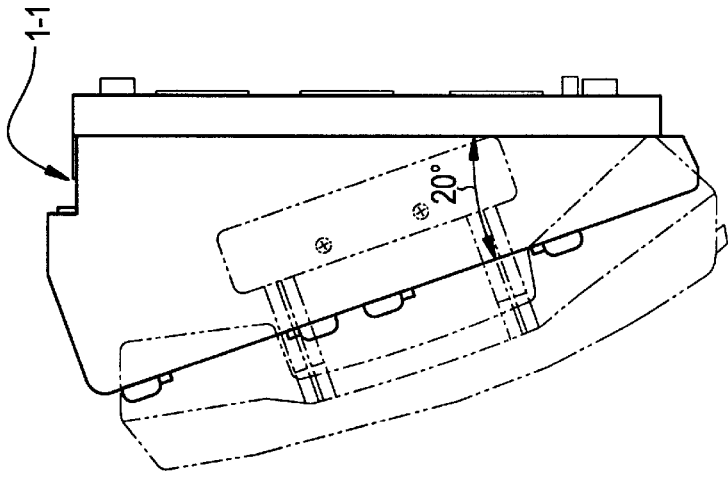

FIG. 2 shows an appearance of communication board (DB) shown in FIG. 1. (a) is a its plane view, (b) is a its back view, and (c) is a its right side view.

As shown in FIG. 2 (a), the communication board (DB) 1—1 provides a pagination key 2-3, function keys 2-4, an extension key 2-5, function key 2-6, dial key 2-7, a volume control key 2-8 and a dial monitor liquid crystal (LCD) 2-9 on the board of cabinet 2-1 of the communication board (DB). The pagination key 2-3 combines of fluorescent display tubes (VFD display) 2—2 and hard keys. The function keys 2-4 corresponds to a left and a right hands-set. The volume control key 2-8 controls the hands-set reception sound and the ringer sound of the incoming call.

Hands-free communication board 2-10 is able to connect with the left side of communication board 1—1. On the board face of the hands-free communication board 2-10, it is provided with a hands-free speaker 2-11, a hands-free speaker volume controller 2-12 and a hands-free microphone attaching connector 2-13.

Because the hands-free microphone is of a connector type, it is possible to use the microphones of various lengths.

The two hands-sets 2-14 can be connected to the communication board 1—1. Therefore, this communication board 1—1 can communicate with simultaneously two opposite parties by means of two hands-sets.

Figure 3:
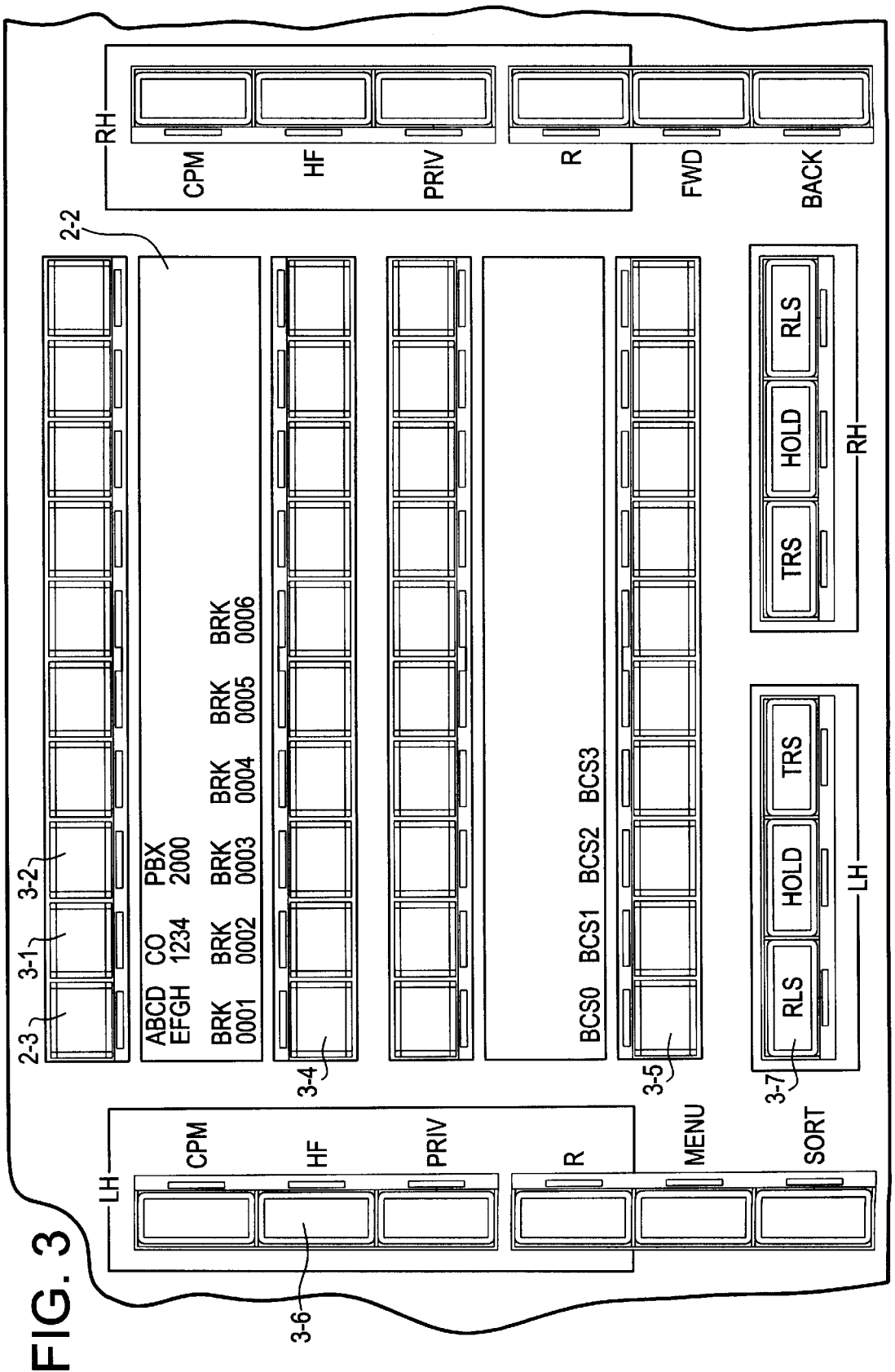
FIG. 3 is an enlarged view of pagination keys on the communication board according to the embodiment.

FIG. 3 is an enlarged view of the pagination key 2-3 on the board face of the communication board 1—1.

As shown in FIG. 3, so many as eight letters per one line of the line name accommodated in the pagination key 2-3 can be displayed on VFD display 2—2. For example, a line key, a one-touch auto dial key and a broadcasting transmission key (simultaneous all together transmission key), respectively accommodated in the pagination key 2-3 can be flexibly stored at any position. The accommodation contents of the pagination key 2-3 are changeable.

As shown in FIG. 3, one-touch auto dials of "ABCDEFG" are accommodated in the pagination key 2-3, public line "CO1234" in 3-1, PBX extension line "PBX2000" in 3-2, broker line "BRK0001" in 3-4, and broadcasting transmission key in 3-5.

Operation of the dealing communication system according to the embodiment will be described.

As to basic operation of the communication board 1—1, when the communication board 1—1 carries out the outgoing call to the public line accommodated in the pagination key 3-1, the pagination key 3-1 is pushed down.

When the pagination key 3-1 is pushed down, the communication board 1—1 informs the outgoing call information and the line information to the central processing equipment (CPE) 1-22 of the line control unit (LCU) 1-6 through the digital communication board line circuit (DBDLIN) 1-7.

The central processing equipment (CPE) 1-22 connects the public line trunk (COT) 1-12 corresponding to the outgoing call to the digital communication board line circuit (DBDLIN) 1-7.

After this, a dialing of the dial key 2-7 operates the communication board 1—1, so that the communication board 1—1 informs the dial information to the central processing equipment (CPE) 1-22 and transmits the dial information to the line through the public line trunk (COT) 1-12. When the opposite party corresponding to the outgoing call responds to this outgoing call, it becomes possible to communicate between the two parties by the hands-set 2-14.

After setting of the hands-free key 3-6, it becomes possible to carry out a hands-free communication by means of the hands-free speaker 2-11 and the hands-free microphone of the hands-free connector 2-13 on the hands-free communication board 2-10.

Figure 4:
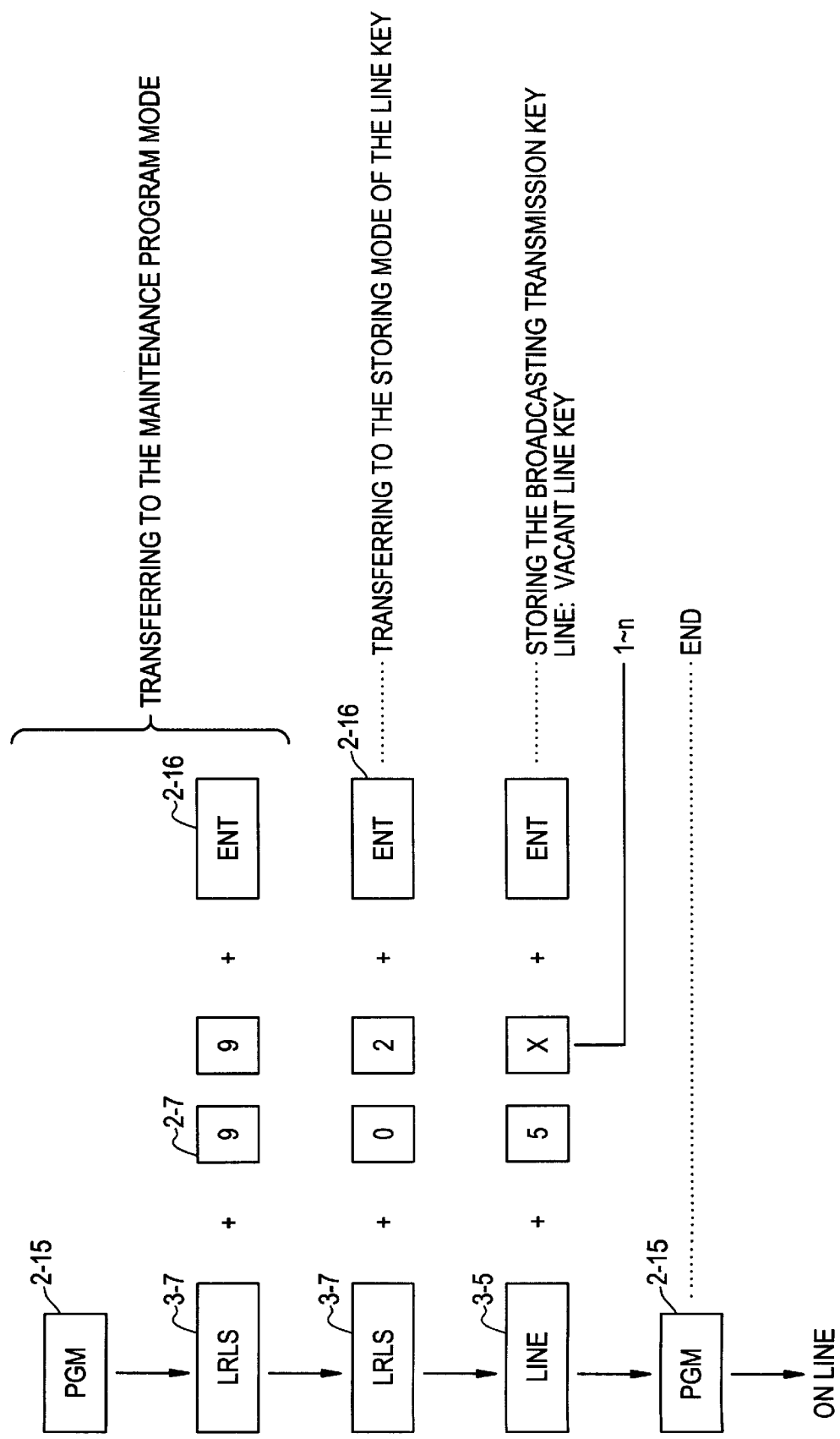
FIG. 4 is an explanation view showing a storing operation procedure of broadcasting transmission keys on the communication board according to the embodiment.

FIG. 4 is an explanation view of a storing procedure of the broadcasting transmission key 3-5 of the communication board (DB) 1—1 shown in FIG. 1. As shown in FIG. 4, PGM key 2-15 is pressed in order to transfer to the maintenance program mode. Next, LRLS key 3-7, dial key 2-7 "99", and ENT key 2-16 are pushed down, so that it is transferred to the maintenance program mode.

Next, the procedure of transferring to the storing mode of the line key will be explained. LRLS key 3-7, dial key 2-7 "02", and ENT key 2-16 are pressed, so that it is transferred to the line key storing mode.

Next, the procedure of storing the broadcasting transmission key 3-5 will be explained. According to this embodiment, a key is selected from the vacant line keys 3-5. The selected vacant line key 3-5 is pressed, the dial key 2-7 and the outgoing call key number "5-1n" are appointed by the dial key 2-7, and ENT key 2-16 is pushed down. Further, in order to store continuously store the broadcasting transmission key 3-5, this procedure is repeated from the line key pressing-down step. The PGM key 2-15 is pushed down, so that this procedure ends.

Figure 5:
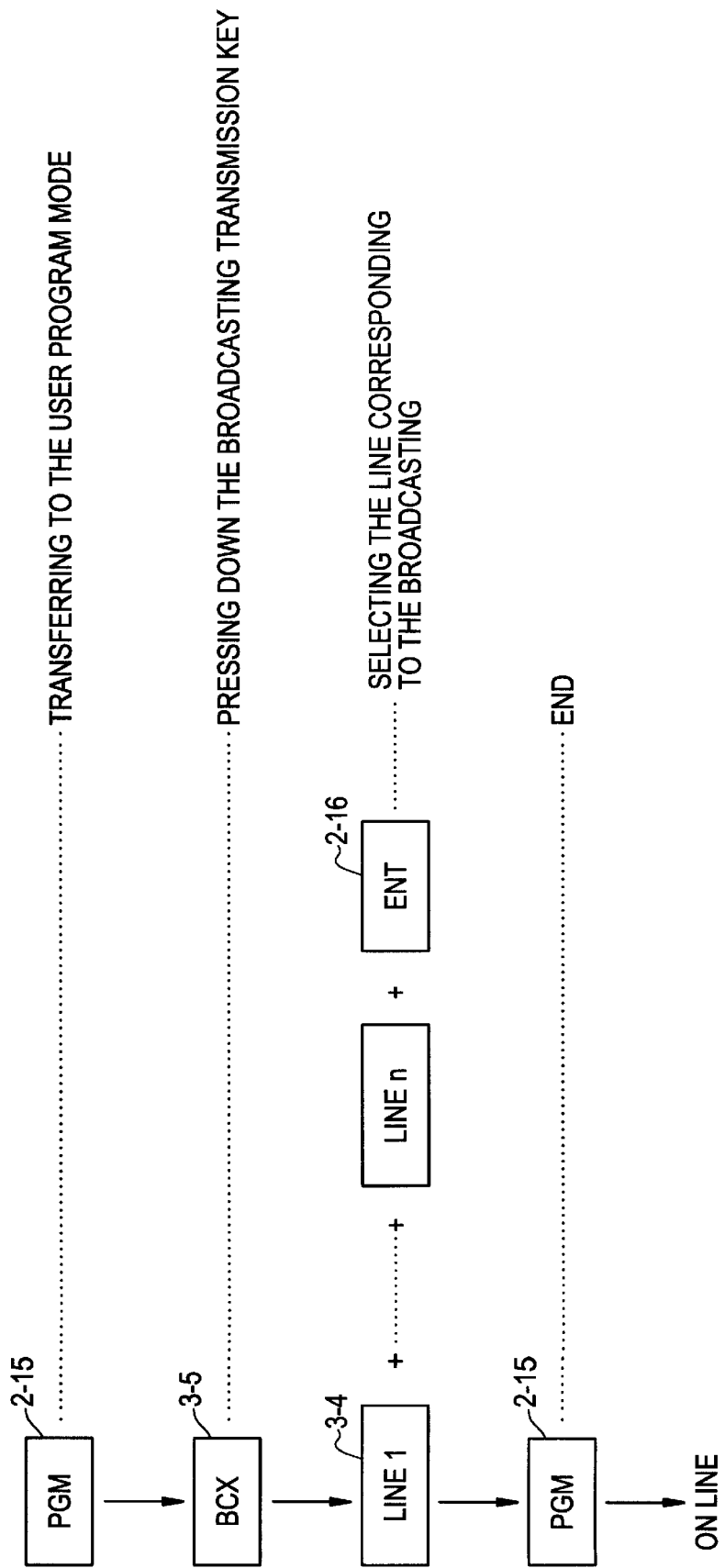
FIG. 5 is an explanation view showing a storing operation procedure of the trunk corresponding to the broadcasting on the communication board of the embodiment.

FIG. 5 is an explanation view showing a storing procedure of the trunk corresponding to the broadcasting in the communication board (DB) 1—1 shown in FIG. 1.

As shown in FIG. 5, PGM key 2-15 is pressed down to transfer to a user program mode. Next, the broadcasting transmission key (BCX) 3-5 stored as shown in FIG. 4 is pushed down. Further, the line of the one line group corresponding to the broadcasting can be selected by pressing down the line key 3-4. The selected line can be stored by pushing down the ENT key 2-16, until the number of the stored line corresponding to the broadcasting reaches 16 lines at its maximum. In order to continuously store the key, this procedure of storing the trunk is repeated from a pressing-down of the broadcasting transmission key (BCX) 3-5. In order to end this procedure, the PGM key 2-15 is pressed down.

Figure 6:
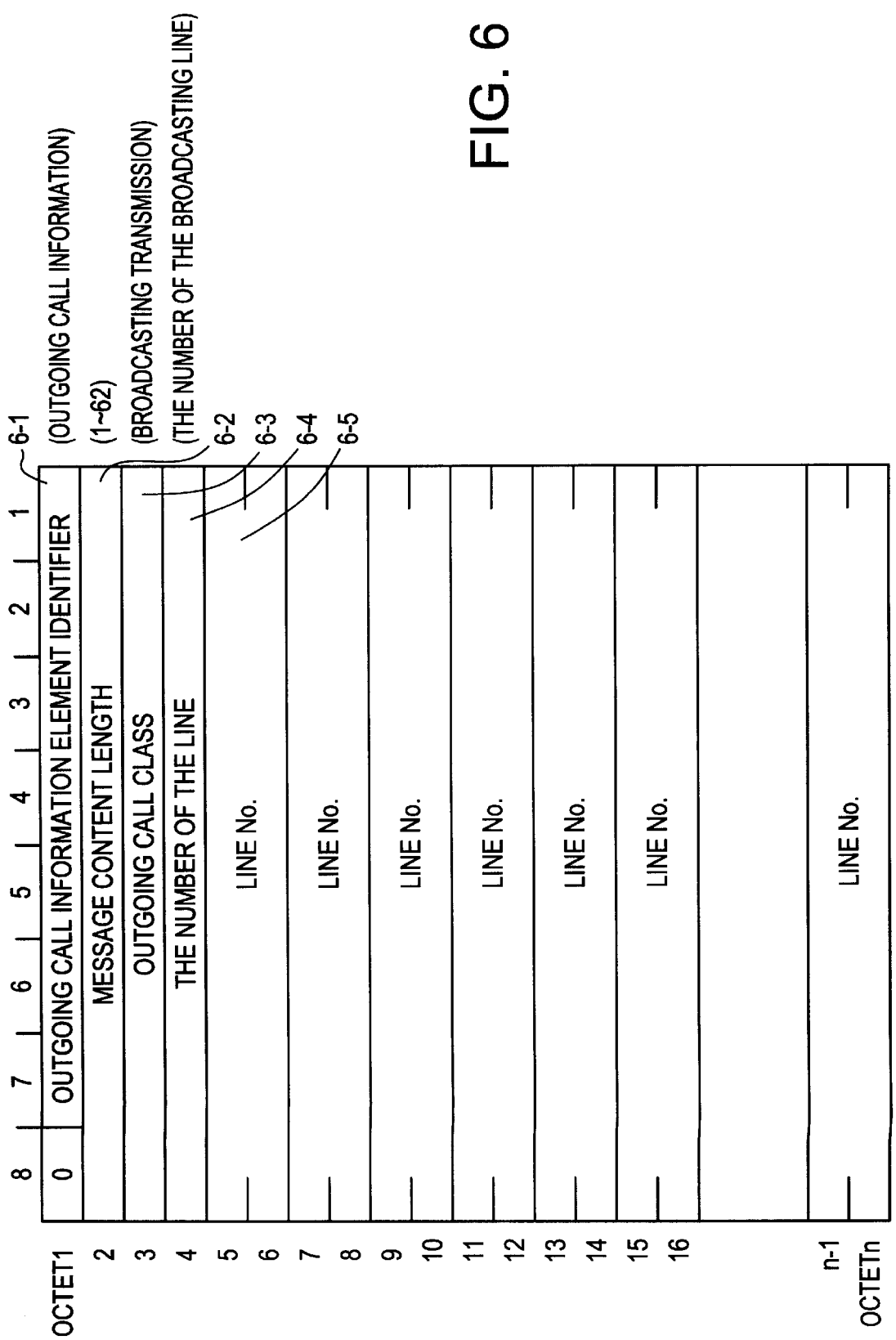
FIG. 6 is an explanation showing a broadcasting outgoing call information informed to a line control unit from the communication board according to the embodiment.

FIG. 6 is an enlarged view showing the broadcasting outgoing call information which is transmitted from the communication board (DB) 1—1 to the line control unit 1-6.

When the broadcasting transmission key 3-5 stored is pressed down, the communication board (DB) 1—1 informs the broadcasting outgoing call information to the line control unit 1-6 through the digital communication board line circuit (DBDLIN) 1-7.

The contents of this broadcasting outgoing call information consist of an outgoing call information element identifier 6-1, a message content length 6-2, an outgoing call class 6-3, a broadcasting line number 6-4, and a line No. 6-5. The broadcasting line number 6-4 corresponds to the number of the line 3-4 corresponding to the broadcasting. The line No. 6-5 is the line number of the line 3-4 corresponding to the broadcasting stored as shown in FIG. 5.

Figure 7:
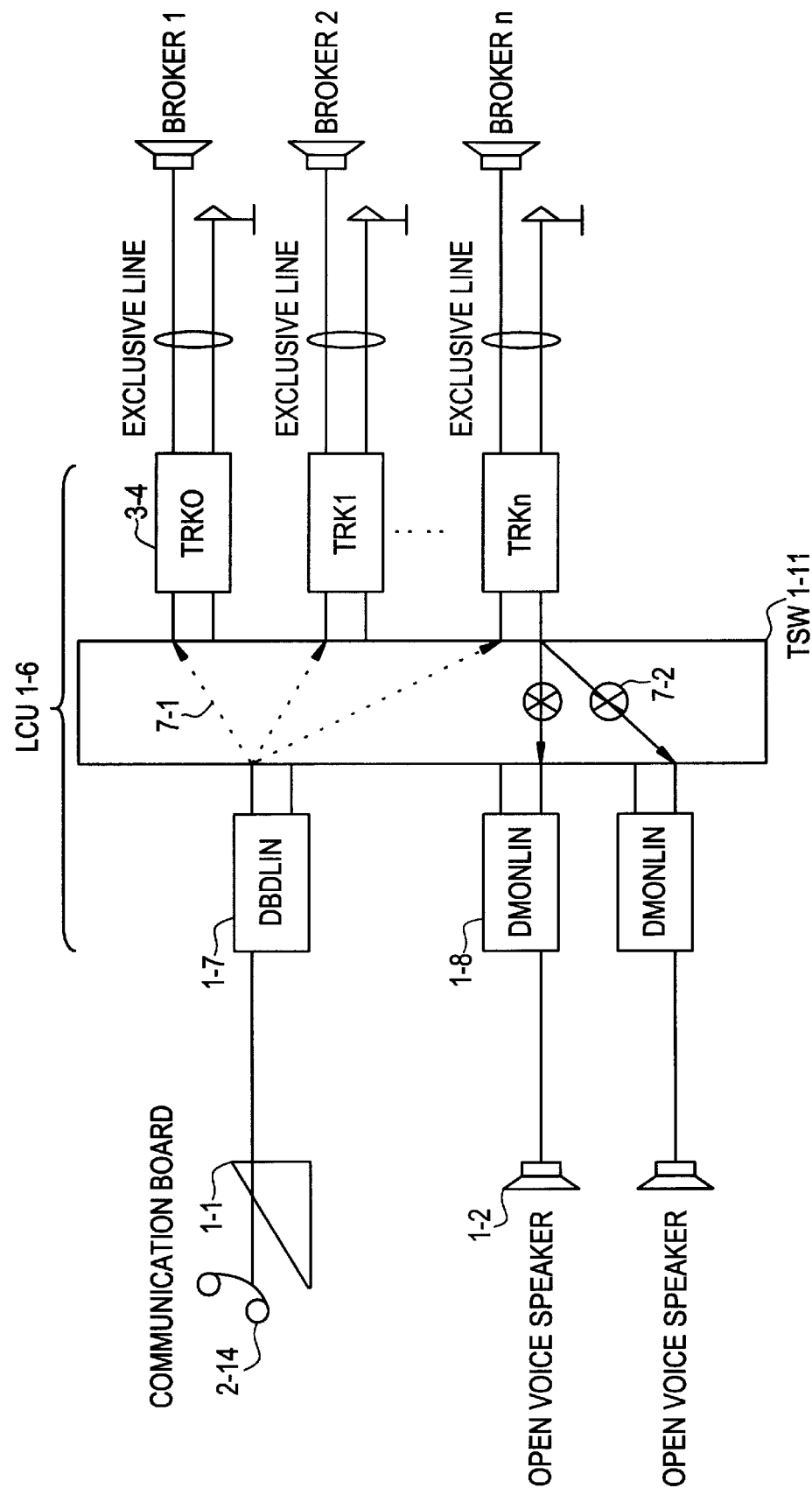
FIG. 7 is an explanation showing a path connection when the broadcasting is transmitted from the line control unit of the embodiment.

When the line control unit (LCU) 1-6 shown in FIG. 7 receives the broadcasting outgoing call information, the line control unit (LCU) 1-6 connects in multiple the communication path at the transmission side 7-1 of the digital communication board line circuit (DBDLIN) 1-7 containing the transmission side communication board (DB) 1—1 to the trunk 3-4 corresponding to the broadcasting through the communication path switch (TSW) 1-11 in one-way.

Further, the line control unit (LCU) 1-6 catches the exclusive line of TRK 3-4 and makes the broadcasting communication from the hands-set 2-14 to the broker corresponding to the exclusive line to be realized.

When the broadcasting corresponding line is monitor-set by the open voice speaker 1-2, the communication path 7-2 in the communication path switch (TSW) 1-11 is disconnected in order to prevent a howling from generating.

When the RLS key 3-7 is pushed down after ending the broadcasting, the communication board 1—1 informs the line control unit (LCU) 1-6 of the on-hook information. When the line control unit 1-6 receives the on-hook information, the line control unit 1-6 opens the TRK 3-4 and disconnects the path connection 7-1 in the communication path switch (TSW) 1-11.

Also, the trunk having the communication path 7-2 disconnected during monitor being set returns to its original monitoring condition.

According to the embodiment, using the hands-set (or the hands-free microphone) of the communication board 1—1 and not-installing the open voice device, this communication board 1—1 can realize the broadcasting communication (the simultaneous all together communication) function. As a result, because such open voice device is not necessary, it is possible to make a cost-performance ratio of the system good and to guarantee a wide working space on the dealing desk.

According to the embodiment of the invention, the key position of the broadcasting transmission key (simultaneous all together transmission key) 3-5 displayed on the VFD display (key display means) 2—2 is changeable. Therefore, user can set the key broadcasting transmission key 3-5 at any position.

According to the prior art, the line of the line group to be called up by the broadcasting communication is able to be stored only with setting the speaker in the open voice device.

However, according to the embodiment, the line of the line group to be called up can be flexibly stored without using the open voice device. Therefore, it is possible to remarkably improve the operability and the functionality with reference to the broadcasting communication.

According to the embodiment of the invention, a plurality of the broadcasting transmission keys 3-5 displayed on the VFD display 2—2 can be flexibly stored. So it becomes possible for the broadcasting opposite party to set a plurality of patterns, resulting in a high efficiency of business.

Further, according to the embodiment, it is possible to attain an ordinal individual communication to the line corresponding to the broadcasting communication.

Also, according to the embodiment, the line control unit 1-6 recognizes the corresponding line under the broadcasting communication from the one communication board 1—1. Therefore, even though the other communication board executes the broadcasting communication to the corresponding line, the communication between the one communication board 1—1 and the corresponding line has a priority. Therefore, the present broadcasting communication by the communication board 1—1 is not hindered. Further the communication board 1—1 under the present broadcasting transmission operation can execute a broadcasting transmission communication with the other line except for the corresponding line under the broadcasting communication. It is noted that the similar concept can be applied to the communication board 1—1 under individual transmission, not such simultaneous communication.

According to the embodiment, the indication of the line key under the broadcasting transmission is displayed with its own communication indication. Therefore, the user is able to see and recognize the line under the present broadcasting transmission.

According to the embodiment, when the line corresponding to the broadcasting communication is monitor-set by the open voice speaker 1-2, the line control unit 1-6 disconnects spontaneously the communication path at the speaker side in the communication path switch 1-11 during the broadcasting communication and restores again the communication path at the monitor side in ending the broadcasting. Therefore, it can certainly prevent a howling from generating during the broadcasting communication.

Furthermore, according to the embodiment, it is possible to overlap-store the broadcasting transmission key 3-5 by means of pagination function on the VFD display 2—2, resulting in a set of a plurality of patterns of the broadcasting opposite parties, so the users can improve the effectiveness of business.

I claim:

1. A dealing communication system having a public line trunk connected to the public line, a communication board line circuit connected to a communication board, and a line control unit for accommodating and connecting the public line trunk and the communication board line circuit;

wherein the communication board has a key display means for displaying the line key with an one-touch operation instructing a transmission operation for executing an outgoing call to the particular line or a reception operation for receiving an incoming call, and a simultaneous all together transmission key instructing a simultaneous all together transmission operation of all lines of the line group previously stored by an one-touch operation, a hands-set for carrying out a communication, and a control means for executing the simultaneous all transmission operation to all lines of the line group in response to the one-touch operation of the simultaneous all together transmission key displayed on the key display means and being able to execute the simultaneous all together transmission to all lines of the line group through the hands-set.

2. The dealing communication system according to claim 1, wherein the key position of the simultaneous all together transmission key displayed on the key display means can be flexibly stored according to a predetermined operation.

3. The dealing communication system according to claim 1, wherein the line of the line group to be called up by the simultaneous all together transmission can be flexibly stored according to a predetermined operation.

4. The dealing communication system according to claim 3, wherein the 16 lines of one line group to be called up by the simultaneous all together transmission can be stored at the maximum.

5. The dealing communication system according to claim 1, wherein a plurality of the simultaneous all together transmission keys displayed on the key display means of the communication board can be flexibly stored.

6. The dealing communication system according to claim 1, wherein, when the line corresponding to the line key, the lines of the line group to be called up by the simultaneous all together communication can be used in an ordinal call transmission and an ordinal call reception, and the line can be used in an individual communication.

7. The dealing communication system according to claim 5, wherein the line of each line group stored in the simultaneous all together transmission key can be stored in an overlap manner on other simultaneous all together transmission key, when a simultaneous all together transmission operation from the other communication board is applied to the corresponding line under such simultaneous all together communication with the one communication board, the communication between the other communication board under the present simultaneous all together communication and the corresponding line has a priority.

8. The dealing communication system according to claim 1, wherein, when the outgoing call operation is carried out by the simultaneous all together transmission key, the line key corresponding to the line corresponding to the outgoing call is changed to its own communication indication.

9. The dealing communication system according to claim 1, wherein, when the outgoing call operation is carried out by the simultaneous all together transmission key, a spontaneous disconnection of the communication path at the reception side and a cut-off of the speaker prevent a howling from generating.

10. The dealing communication system according to claim 5, wherein the key display means of the communication board has a pagination function, thus an overlap-storing of the simultaneous all together transmission key is made possible on a plurality of pages of the key display means.

* * * * *